Patented Aug. 29, 1950

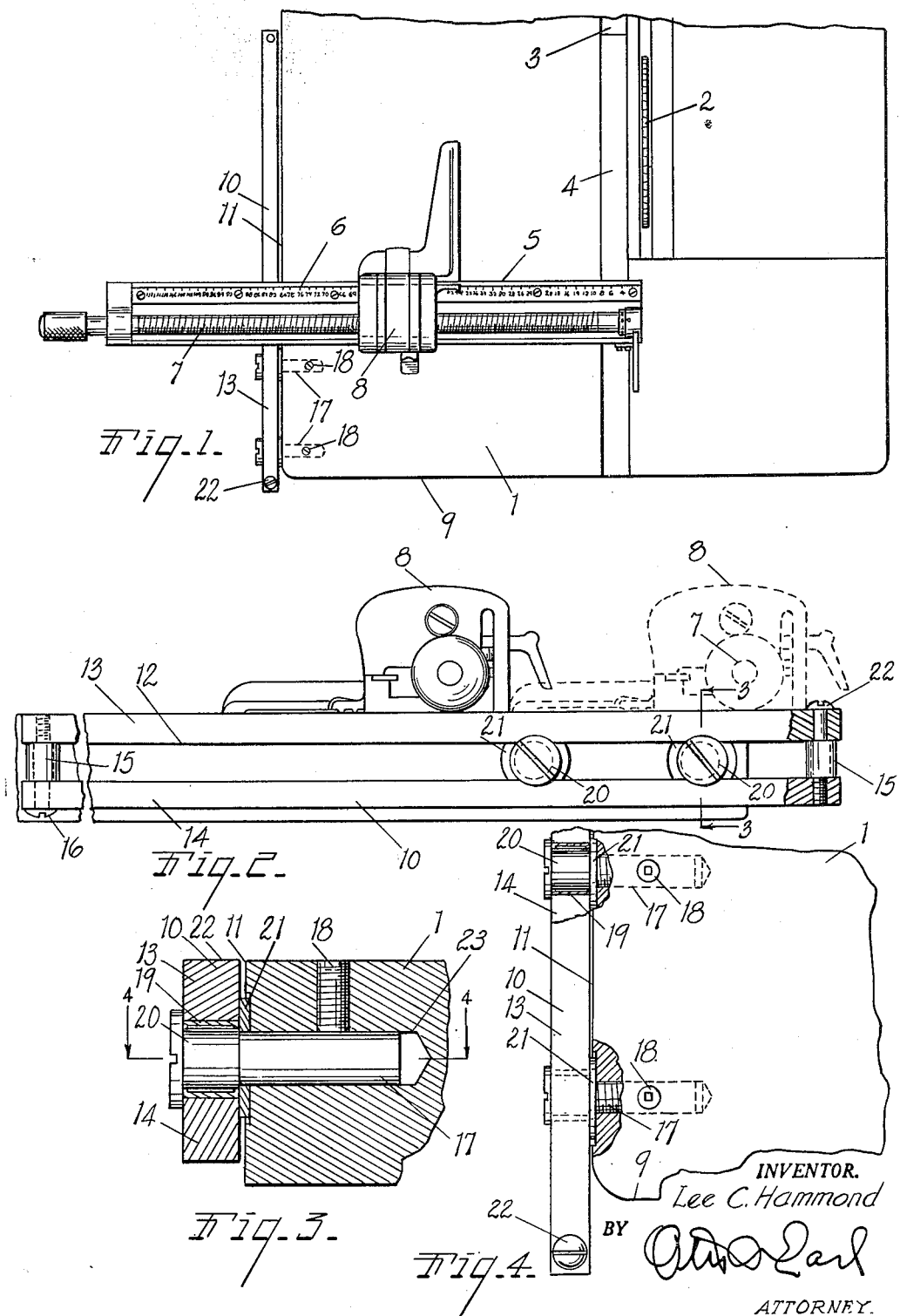

2,520,837

UNITED STATES PATENT OFFICE 2,520,837

SAW GAUGE

Lee C. Hammond, Kalamazoo, Mich., assignor to Hammond Machinery Builders, Inc., Kalamazoo, Mich., a corporation of Michigan Application May 10, 1946, Serial No. 668,743

3 Claims. (Cl. 29—67)

1

This invention relates to improvements in saw gauges.

The main objects of this invention are:

First, to provide a gauge for sawing machines which is well adapted for use in printing establishments for the sawing of type plates and the like and one which has a wide range of capacity in proportion to the size of the machine embodying the features.

Second, to provide a saw table provided with a gauge bar which may be adjusted to positions beyond the front edge of the table and is effectively supported in such positions.

Third, to provide in a structure of this character a gauge bar with an auxiliary slide which is automatically extended to supporting position when the gauge bar is drawn forwardly beyond the forward edge of the table.

Objects relating to details and economies of the invention will appear from the description to follow. The invention is defined and pointed out in the claims.

A preferred embodiment of the invention is illustrated in the accompanying drawing, in which:

Fig. 1 is a fragmentary plan view of a sawing machine embodying the features of my invention, some of the parts being shown conventionally.

Fig. 2 is an enlarged fragmentary side elevation viewed from the left of Fig. 1, the gauge bar being shown in one position by full lines and in another position by dotted lines.

Fig. 3 is an enlarged fragmentary view mainly in section on line 3—3 of Fig. 2 showing details of the mounting of the auxiliary gauge bar slide.

Fig. 4 is a fragmentary view partially in section on a line corresponding to line 4—4 of Fig. 3.

In the accompanying drawing, I represents the saw table and 2 the saw. The table is provided with a slideway 3 for the gauge bar slide 4. The gauge bar 5 is fixedly secured to the front end of the slide 4 to extend at right angles therefrom.

The gauge bar is provided with suitable pica scale indicia designated generally by the numeral 6 and with an adjusting screw 7 for the gauge finger slide 8. The structural details of the gauge finger slide form no part of my present invention but is the subject matter of certain claims of my application Serial No. 668,742, filed May 10, 1946, for Letters Patent filed concurrently herewith. Either slide of that application may be used.

The slide 4 is adapted to permit the gauge bar

2 being drawn forwardly beyond the front edge 9 of the saw table. To support the gauge bar in positions forwardly of the front edge of the table I provide an auxiliary slide 10 which is slidably mounted at the outer side edge 11 of the table. This auxiliary slide 10 is provided with a longitudinal slot 12, the slide being preferably made up of top and bottom members 13 and 14 respectively held in spaced relation by the spacers 15 and the securing screws 16.

Studs 17 are rotatable in the bores in the edge of the table and secured in their adjusted positions therein by the set screws 18. The studs have eccentric portions 20 which are preferably provided with "needle" bearings designated generally by the numeral 19 and which support the slide 10 with its upper face 22 flush with the surface of the table 1. The studs may be rotatably adjusted to effect this alignment when the parts are assembled and to compensate for wear.

Disk-like end wearing members 21 are arranged in the inner ends of the bearings. This provides a very free sliding movement for the auxiliary slide, at the same time supporting it to effectively support the gauge bar when the slide is in forwardly extended position.

The auxiliary slide 10 is provided with an upwardly projecting lug 22 with which the gauge bar automatically engages when the gauge is drawn forwardly beyond the front edge of the table thereby extending the auxiliary slide so that the gauge bar is effectively supported beyond the front end of the table by the slides 14 and 10 and the gauge bar can be freely adjusted across the table and relative to the bar 10 when it is in retracted position.

I have not illustrated and described various possible adaptations of my invention as it is believed that this disclosure will enable those skilled in the art to embody or adapt my invention as may be desired.

Having thus described my invention, what I claim as new and desire to secure by Letters Patent, is:

1. In a saw gauge mechanism, the combination of a saw table provided with a slideway parallel to the saw, an elongated gauge bar main slide freely disposed in said way with its top flush with the top of the table and adapted to be extended at the front of the table with a substantial length of its rear portion remaining in said way, a gauge bar provided with a laterally adjustable gauge finger and secured to the forward end of the slide to extend at right angles thereto transversely of the table and to be adjusted longitudinally across the face of the table and to positions forwardly of the front edge of the table, a longitudinally slotted auxiliary slide for said gauge bar disposed on the outer side edge of the table, and studs on the outer edge of said table engaging the slot of said auxiliary slide and whereby said auxiliary slide is supported with its upper edge flush with the top of the table and to be extended at the front of the table or retracted at the edge of the table, said gauge bar being unconnectedly lapped upon and extending laterally beyond said auxiliary side, said auxiliary slide being provided with an upwardly projecting lug at its front end with which the gauge bar engages to extend the auxiliary slide to gauge supporting position when the gauge bar is drawn forwardly beyond the forward edge of the table.

2. In a saw gauge mechanism, the combination of a saw table provided with a slideway parallel to the saw, an elongated gauge bar main slide freely disposed in said way with its top flush with the top of the table and adapted to be extended at the front of the table with a substantial length of its rear portion remaining in said way, a gauge bar provided with a laterally adjustable gauge finger and secured to the forward end of the slide to extend at right angles thereto transversely of the table and to be adjusted longitudinally across the face of the table and to positions forwardly of the front edge of the table, and an auxiliary slide for said gauge bar slidably mounted on the outer side edge of the table to be extended at the front of the table or retracted at the edge of the table, said gauge bar being unconnectedly lapped upon and extending laterally beyond said auxiliary slide, said auxiliary slide being provided with a projection at its front end with which the gauge bar engages to extend the auxiliary slide to gauge bar supporting position when the gauge bar is drawn forwardly beyond the forward edge of the table.

3. In a saw gauge mechanism, the combination of a saw table provided with a slideway parallel to the saw, an elongated gauge bar main slide freely disposed in said slideway with its top flush with the top of the table and adapted to be extended at the front of the table with a substantial length of its rear portion remaining in said way, a gauge bar provided with a laterally adjustable gauge finger and secured to the forward end of the slide to be adjusted longitudinally across the face of the table and to positions forwardly of the front edge of the table, a longitudinally slotted auxiliary slide for said gauge bar disposed on the outer edge of the table, studs on the outer edge of the table provided with eccentric bearing supporting portions, said eccentric supporting portions being provided with needle bearings received in said slot of said auxiliary slide, and means for securing said studs in their adjusted positions to position the upper edge of the auxiliary slide flush with the surface of the table, said gauge bar having a portion engageable with a vertically and laterally projecting surface on the forward end of said auxiliary slide to automatically extend said auxiliary slide when the gauge bar is adjusted to positions beyond the front edge of the table.

LEE C. HAMMOND.

REFERENCES CITED

The following references are of record in the file of this patent:

UNITED STATES PATENTS

| Number | Name | Date |
|---|---|---|
| 1,095,363 | Weiss | May 5, 1914 |
| 1,746,830 | Harmon | Feb. 11, 1930 |
| 1,938,548 | Tautz | Dec. 5, 1933 |
| 2,202,434 | Seybold | May 28, 1940 |
| 2,273,715 | Lonskey et al. | Feb. 17, 1942 |
| 2,319,555 | Premo | May 18, 1943 |